US012222966B2

United States Patent
Chklovski et al.

(10) Patent No.: US 12,222,966 B2
(45) Date of Patent: *Feb. 11, 2025

(54) GENERATING CLUSTERS BASED ON MESSAGING SYSTEM ACTIVITY

(71) Applicant: Snap Inc., Santa Monica, CA (US)

(72) Inventors: Anatoli Chklovski, Maina del Rey, CA (US); Douglas Cohen, Venice, CA (US); Scott Lippert, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 17/328,540

(22) Filed: May 24, 2021

(65) Prior Publication Data

US 2021/0279262 A1    Sep. 9, 2021

Related U.S. Application Data

(63) Continuation of application No. 15/945,298, filed on Apr. 4, 2018, now Pat. No. 11,023,496.

(51) Int. Cl.
*G06F 16/28* (2019.01)
*H04L 51/04* (2022.01)
*H04L 67/50* (2022.01)

(52) U.S. Cl.
CPC .......... *G06F 16/285* (2019.01); *H04L 51/04* (2013.01); *H04L 67/535* (2022.05)

(58) Field of Classification Search
None
See application file for complete search history.

(56) References Cited

U.S. PATENT DOCUMENTS

| 9,750,433 | B2 * | 9/2017 | Hu | A61B 5/002 |
| 10,728,348 | B2 * | 7/2020 | Kumar | H04L 67/01 |
| 11,627,215 | B1 * | 4/2023 | Puvvula | H04L 67/306 |
| | | | | 715/741 |

(Continued)

OTHER PUBLICATIONS

NPL-Haijew, "Cluster Analyses and Related Data Visualizations in NVivo 11 Plus", Nov. 22, 2016 (Year: 2016).*

(Continued)

*Primary Examiner* — Polina G Peach
*Assistant Examiner* — Anugeetha Kunjithapatham
(74) *Attorney, Agent, or Firm* — Schwegman Lundberg & Woessner, P.A.

(57) ABSTRACT

A system analyzes user activity data generated by computing devices associated with a plurality of users in a messaging system to extract a random user from the plurality of users. Based on determining that user activity data associated with the random user comprises a consistent pattern, a cluster associated with the consistent pattern is generated and the random user is added to the cluster. Then user activity data for the other users in the plurality of users is analyzed to determine whether user activity data for each of the other users comprises a similar pattern as the generated cluster. Each user that is determined to be associated with user activity data comprising a similar pattern as the consistent pattern of the generated cluster is added to the generated (Continued)

cluster and user activity data associated with each user added to the generated cluster is removed from the user activity data.

18 Claims, 7 Drawing Sheets

(56) References Cited

U.S. PATENT DOCUMENTS

| | | | |
|---|---|---|---|
| 2009/0307176 A1* | 12/2009 | Jeong | G06F 16/337 706/52 |
| 2010/0174813 A1* | 7/2010 | Hildreth | G06Q 10/107 709/224 |
| 2010/0312769 A1* | 12/2010 | Bailey | H04L 51/52 707/769 |
| 2014/0289248 A1 | 9/2014 | Kang et al. | |
| 2014/0330643 A1* | 11/2014 | Grigorovici | G06Q 30/0255 705/14.52 |
| 2015/0127728 A1 | 5/2015 | Marti et al. | |
| 2015/0234901 A1* | 8/2015 | Moritz | G06F 16/29 707/776 |
| 2015/0236910 A1* | 8/2015 | Shivashankar | H04W 24/10 370/254 |
| 2016/0007912 A1* | 1/2016 | Hu | A61B 5/002 600/595 |
| 2017/0099358 A1* | 4/2017 | Perez | H04L 51/52 |
| 2017/0286845 A1 | 10/2017 | Gifford et al. | |
| 2017/0323002 A1* | 11/2017 | Singh | G06F 16/24568 |
| 2017/0353565 A1* | 12/2017 | Kumar | H04L 67/02 |

OTHER PUBLICATIONS

"U.S. Appl. No. 15/945,298, Final Office Action mailed Aug. 21, 2020", 24 pgs.

"U.S. Appl. No. 15/945,298, Non Final Office Action mailed Feb. 6, 2020", 30 pgs.

"U.S. Appl. No. 15/945,298, Notice of Allowance mailed Feb. 3, 2021", 8 pgs.

"U.S. Appl. No. 15/945,298, Response filed May 5, 2020 to Non Final Office Action mailed Feb. 6, 2020", 19 pgs.

"U.S. Appl. No. 15/945,298, Response filed Nov. 17, 2020 to Final Office Action mailed Aug. 21, 2020", 16 pgs.

Agarwal, Pankaj K, et al., "Lecture 18: Clustering and classification", CPS260/BGT204.1 Algorithms in Computational Biology, Duke University, [Online] Retrieved from the Internet: <URL: tts://www2.cs.duke.edu/courses/fall03/cps260/notes/lecture18.pdf>, (Oct. 30, 2003), 9 pgs.

Lazzerini, Beatrice, et al., "A system based on hierarchical fuzzy clustering for web users profiling", Proceedings of the IEEE International Conference on Systems, Man and Cybernetics (SMC'03), (Oct. 2003), 6 pgs.

Rosenfeld, Avi, et al., "A Study of WhatsApp Usage Patterns and Prediction Models without Message Content", arXiv:1802.03393v1 [cs:CY], (Feb. 9, 2018), 24 pgs.

* cited by examiner

GENERATING CLUSTERS BASED ON MESSAGING SYSTEM ACTIVITY

PRIORITY CLAIM

This application is a continuation of and claims the benefit of priority of U.S. patent application Ser. No. 15/945,298, filed Apr. 4, 2018, which is incorporated by reference herein in its entirety.

BACKGROUND

A content sharing platform may receive millions of messages from users desiring to share media content such as audio, images, and video between user devices (e.g., mobile devices, personal computers, etc.). The users may comprise a variety of different demographics (e.g., age, gender, location), may have various preferences for content, may have various levels of social activity, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
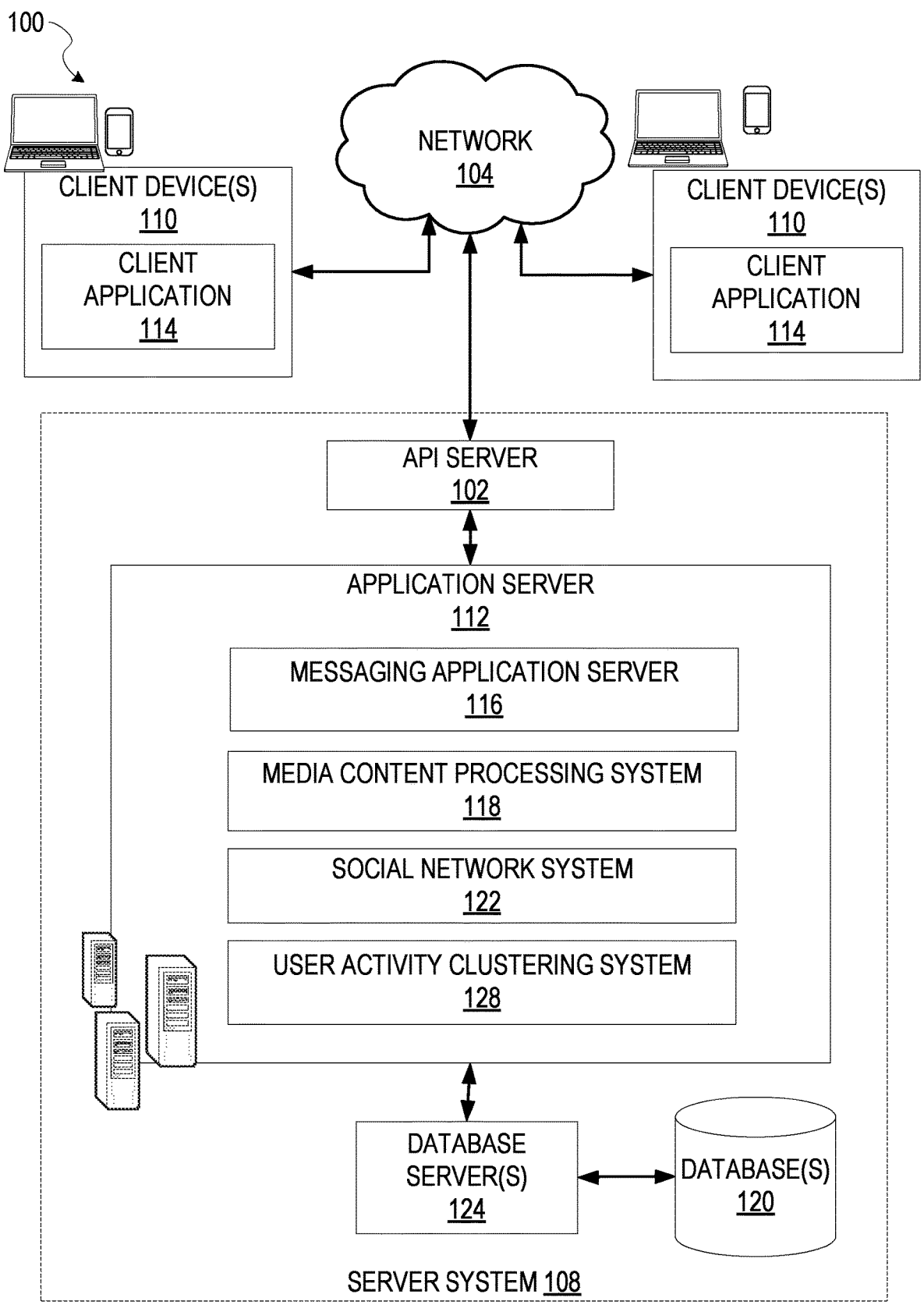
FIG. 1 is a block diagram showing an example messaging system for exchanging data (e.g., messages and associated content) over a network, according to some example embodiments.

Systems and methods described herein relate to detecting and extracting user behavioral patterns based on user system activity. As explained above, a content sharing platform, such as a messaging system, may receive millions of messages from users desiring to share media content such as audio, images, and video between user devices (e.g., mobile devices, personal computers, etc.). The users may comprise a variety of different demographics (e.g., age, gender, location), may have various preferences for content, may have various levels of social activity, and so forth. Conventional approaches for determining interests of users comprise significant market research to determine user demographic data and the like. Example embodiments instead provide a quantitative data approach based on the uniqueness and high volume of data available in content sharing platforms such as messaging systems that allows for user activity to be captured and analyzed for behavioral patterns. The behavioral patterns can be captured as clusters associated with consistent activity patterns in a plurality of time periods. Such behavior patterns and clusters may indicate life patterns of users that would not be captured by conventional approaches.

For example, in one example embodiment a computing system analyzes user activity data generated by a plurality of computing devices associated with a plurality of users in a messaging system to extract a random user from the plurality of users. For each of a plurality of time periods, the computing system analyzes user activity data associated with the random user of the plurality of users to determine whether the user activity data associated with the random user of the plurality of user comprises a consistent pattern. Based on determining that the random user has a consistent pattern, the computing system generates a cluster associated with the consistent pattern and adds the random user to the cluster associated with the consistent pattern. The computing system analyzes user activity data for the other users in the plurality of users to determine whether user activity data for each of the other users in the plurality of users comprises a similar pattern as the generated cluster and adds to the generated cluster, each user that is determined to be associated with user activity data comprising a similar pattern as the consistent pattern of the generated cluster. The computing system removes user activity data associated with each user added to the generated cluster from the user activity data. In this way, example embodiments may use days of the week and times of the day application or system usage patterns to cluster users into behavioral personas.

The generated clusters may be used to determine how content (e.g., technical features, media content, etc.) is provided to one or more users, how users in the clusters react to new or different technical functionality, how users in the clusters react to media content, in some examples, to provide more effective technical features or media content, and so forth. The generated clusters (e.g., groups of users with similar/consistent behavior/system or application usage days/times) provide a unique way to characterize users based on consistent activity patterns in a plurality of time periods (e.g., system or application usage patterns). The generated clusters may also be used in addition to conventional attributes to determine user interests.

FIG. 1 is a block diagram illustrating a networked system 100 (e.g., a messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays and create and access a plurality of media collections.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third party servers, server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, user behavior analysis application, and the like.

In some embodiments, one or more client applications 114 may be included in a given one of the client devices 110, and configured to locally provide the user interface and at least some functionalities, with the client application 114 configured to communicate with other entities in the system 100 (e.g., third party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third party servers, server system 108, etc.).

In one example, a client application 114 may be a messaging application (e.g., messaging client application 114 as referred to below) that allows a user to take a photograph or video, add a caption to or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third party servers (not shown). The server system 108 may include an application programming interface (API) server 102, an application server 112, a messaging application server 116, a media content processing system 118, a social network system 122, and a user activity clustering system 128, which may be communicatively coupled with each other and with one or more data storage(s), such as database(s) 120.

The server system 108 may be a cloud-computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, user activity data, and so forth. The one or more databases 120 may further store information related to third party servers, third party applications, client devices 110, client applications 114, users, and so forth.

The one or more database(s) 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third party servers (not shown). The one or more third party servers may include one or more third party application(s). The one or more third party application(s), executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party server, website, or application, for example, may request and utilize information related to user activity clustering from the server system 108 (e.g., via user activity clustering system 128). The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), and user data (e.g., user click data), as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); and so forth.

The application server 112 hosts a number of applications and subsystems, including the messaging application server 116, the media content processing system 118, the social network system 122, and the user activity clustering system 128. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 204 (depicted in FIG. 2) within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WI-FI, Long Term Evolution (LTE), or Bluetooth).

The user activity clustering system 128 may be responsible for generation of clusters based on user activity data, as described in further detail below.

Figure 2:
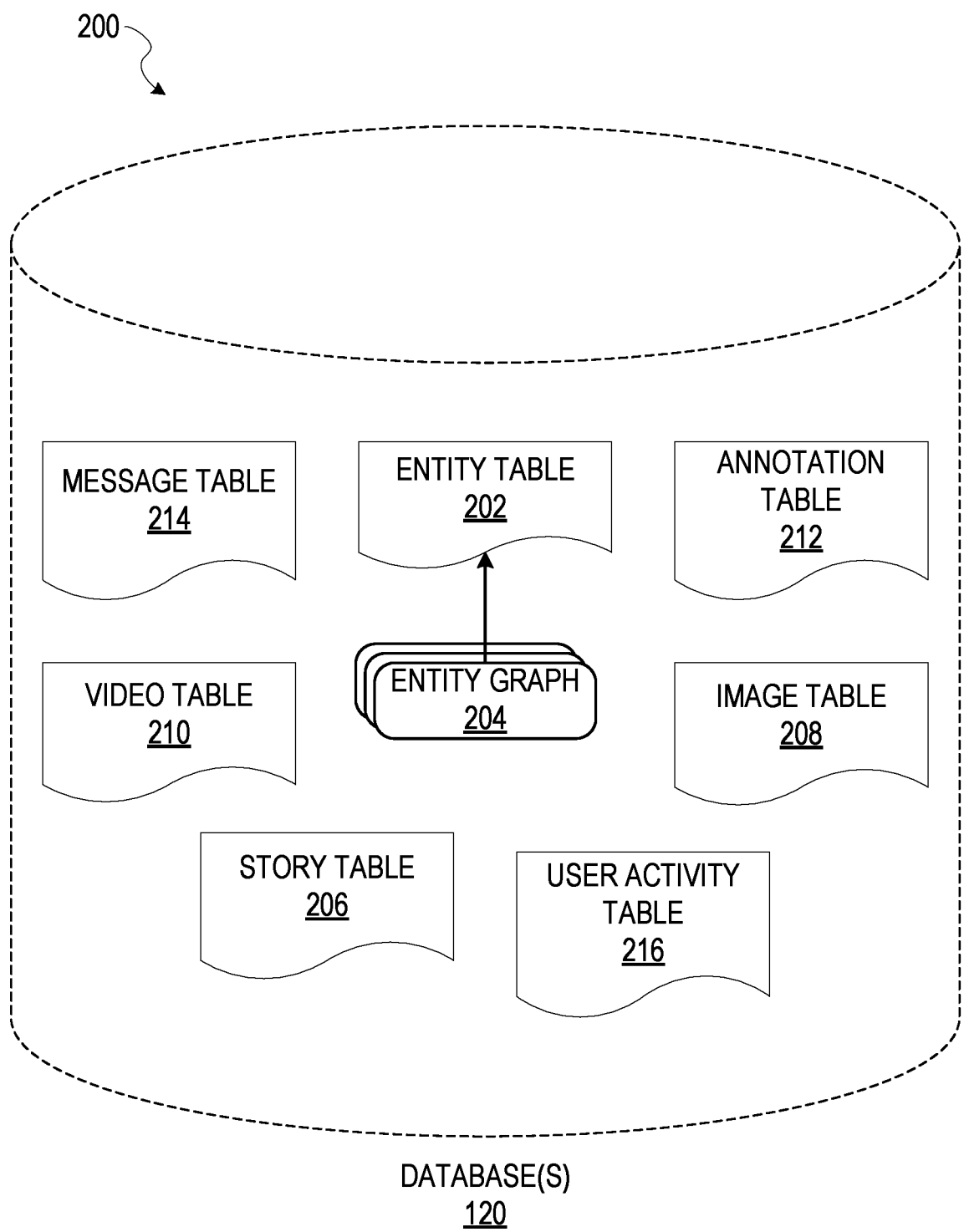
FIG. 2 is a schematic diagram illustrating data which may be stored in a database of a messaging server system, according to some example embodiments.

FIG. 2 is a schematic diagram 200 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 212. Annotation data may also be referred to herein as "creative tools" or "interactive features." Annotation data may comprise predefined interactive messages to be provided to users.

Media overlays or filters, for which data is stored within the annotation table 212, are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 212 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the message table 214. The entity table 202 may associate various annotations from the annotation table 212 with various images and videos stored in the image table 208 and the video table 210.

A story table 206 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 202). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A user activity table 216 stores data related to user activity associated with usage of the messaging system. In one example, the user activity table 216 stores data associated with the days and times that each user is accessing an application 114 related to the messaging system to generate messages, send messages, view messages, search for and view media collections, and so forth.

Figure 3:
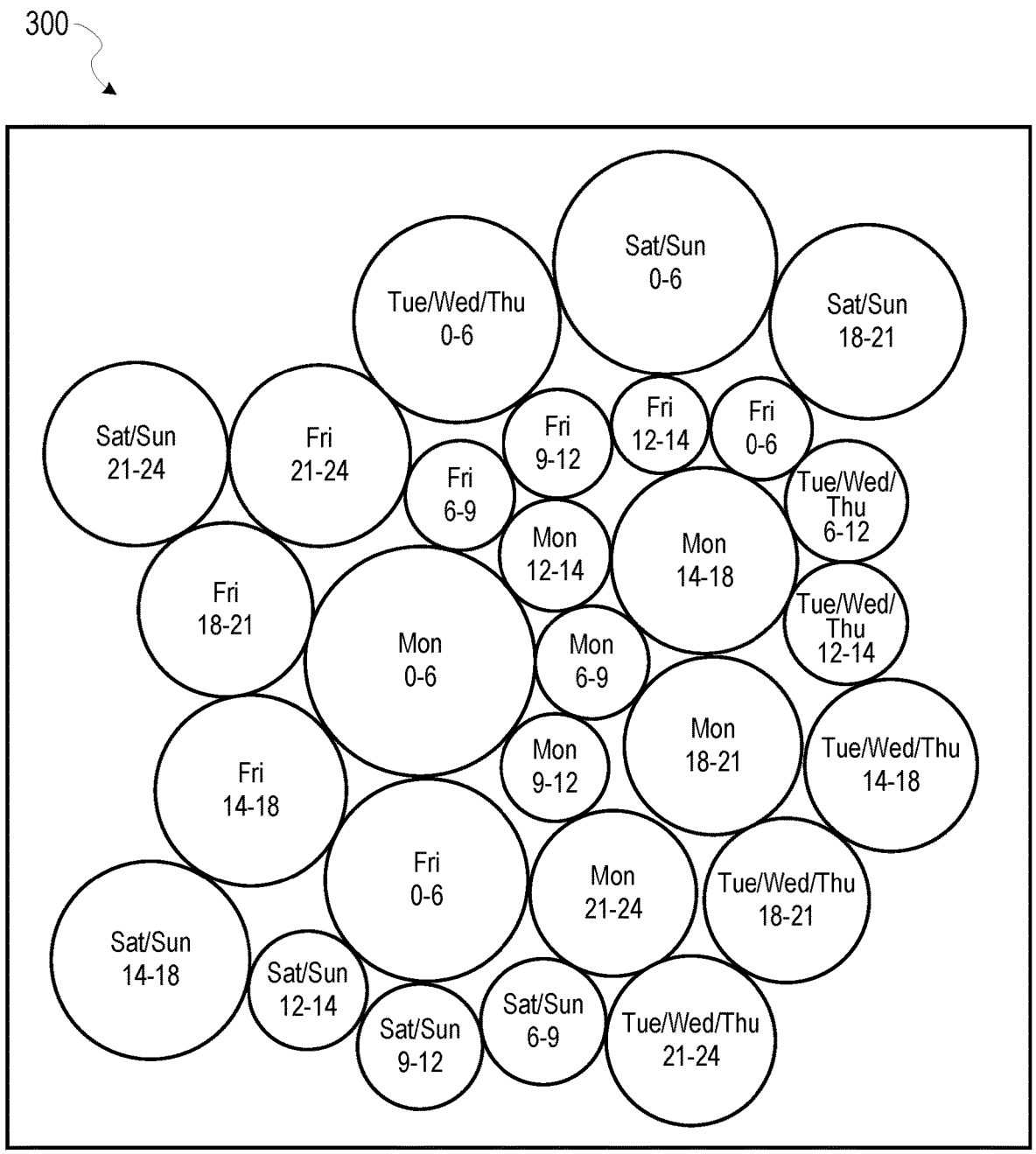
FIG. 3 is a block diagram illustrating time period groupings, according to some example embodiments.

In one example, the user activity table 216 may store user activity data that has been summarized into a plurality of time periods. A computing system (e.g., server system 108, user activity clustering system 128) may generate or define a number of time periods during a week (e.g., N time periods) by grouping similar days of the week and times of the day together that have similar user activity (e.g., based on time periods that have similar user activity). FIG. 3 shows one example 300 of twenty-eight time periods used to make up a week. In the example 300, the size of the bubbles corresponds to the total time spent by users per time period and a color (not shown) may correspond to the average time users spent per time period. For the latter, a darker color may indicate a larger average time and a lighter color a smaller averaged time. For example, a varying shade of green color may be used to show the difference in average time spent by users by time period (e.g., the time period Tue/Wed/Thu 0-6 may be a dark green, the periods of Sat/Sun 0-6 and Sat/Sun 14-18 may be a slightly lighter green, and so forth).

Similar time periods may share characteristics, such as late night long sessions versus early afternoon short sessions. In the example 300, midnight to 6:00 am may be one bucket, Saturday and Sunday may be bucketed together, Monday and Friday may be treated separately because they are more of a transitionary period in a week, and so forth. The twenty-eight time periods is just an example. Embodiments described herein may comprise any number of time periods depending on how granular or broad the buckets desired for the time periods.

In one example, the computing system may define the number of time periods during a week by analyzing user activity data to determine when there are spikes in traffic (e.g., time periods with high user activity). In one example, the computing system may analyze hourly traffic to generate the time periods. For example, the computing system may generate a series of time correlation matrices to understand which time intervals can be bucketed together into time periods for analysis. The correlations between two distinct time intervals may be measured by the percentage of users active in both periods divided the total number of users active in both periods to determine which time intervals are similar. Any two time intervals which are correlated significantly higher than the average correlation among all time intervals may be grouped into a time period. This process can also be iterative by starting with small time intervals, such as 20-30 minutes, for example, to create a first time correlation matrix, and calculate the time periods, then repeat the process using 1-2 hour time intervals, holding the previously generated time periods in groups. This second time correlation matrix will then produce additional groupings of time intervals into time periods. The computing system can continue this process to arrive at fewer, broad time periods, or stop early to allow for more granular time periods depending on the optimal precision or recall for the system. This allows the final time periods to be adjustable and statistically generated based on application usage patterns.

Once the time periods are generated and defined, the computing system may summarize user activity based on the time periods. For example, the computing system may access user activity generated by a plurality of computing devices associated with a plurality of users of a system, such as a messaging system or content sharing platform. The user activity may be stored in one or more databases 120. The computing device may analyze the user activity data to summarize the user activity by the plurality of time periods. The computing system may analyze user activity data for a predetermined amount of time. For example, the computing system may analyze user activity data for a two-week period, an eight-week period, a nine-week period, or the like. The computing system may analyze a certain number of users (e.g., ten-thousand users, one-hundred thousand users, etc.), may analyze users in a particular geographic area or location (e.g., in a country, continent, state, city, etc.), and so forth.

In one example, the computing system may summarize user activity by the plurality of time periods by analyzing user activity for each user, and determining when each user was active during each of the plurality of time periods (e.g., the N time periods). Using the twenty-eight time periods from above as an example, user A may have been active during the predetermined time (e.g., nine weeks) in time periods 1-5, 7, 13, and 28, user B may have been active in time periods 2-3, 7-10 and 25, and so forth. The computing system may store the summarized user activity associated with the plurality of time periods in one or more databases 120.

In one example, the computing system may determine the time periods during which each user was consistently active. To be consistently active during a time period means that a user was active during that time period over a certain predetermined number of weeks. For example, if in the predetermined time (e.g., two weeks, eight weeks, nine weeks, etc.) of user activity data that the computing system is analyzing, the computing device determines that a user is active once in the time period of Mon between midnight and 6:00 am, this may not be enough to be considered consistent (e.g., it may be considered noise versus a behavior pattern). If the user is active during the predetermined time consistently (e.g., at least half of the time, at least two-thirds of the time, etc.), then then the user is considered to be consistently active during that time.

In one example, only the time periods where a user is consistently active will be summarized for the user. For example, if user A is active during periods 1-5, 7, 13, and 28 but only consistently active during time periods 4-5, 7, and 28, then the user activity for user A will only be summarized for time periods 4-5, 7, and 28. The computing system may store the summarized user activity associated with the plurality of time periods in one or more databases 120.

Figure 4:
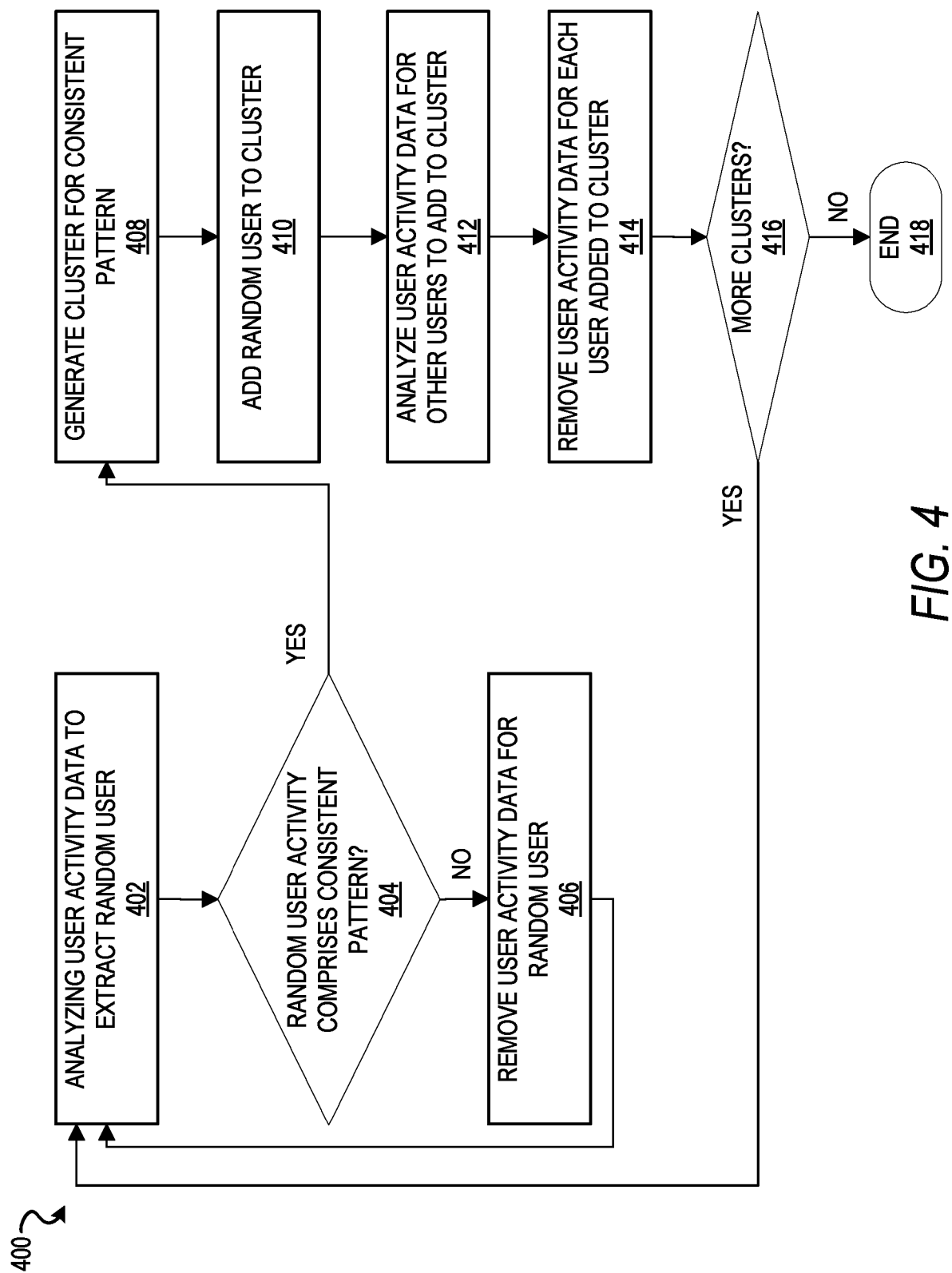
FIG. 4 is a flow chart illustrating aspects of a method, according to some example embodiments.

FIG. 4 is a flow chart illustrating aspects of a method 400 for generating clusters based on user activity data, according to some example embodiments. For illustrative purposes, the method 400 is described with respect to the networked system 100 of FIG. 1. It is to be understood that the method 400 may be practiced with other system configurations in other embodiments.

In operation 402, the computing system analyzes user activity data generated by the plurality of computing devices associated with a plurality of users in a system (e.g., in a content sharing platform or messaging system), to extract a random user from the plurality of users. The computing system may access the user activity data from one or more databases 120. The user activity data may be all user activity data summarized by a plurality of time periods over a predetermined time period (e.g., two weeks, eight weeks, nine weeks, etc.) or it may be only consistent user activity data summarized by the plurality of time periods over the predetermined time period, as described above.

In one example, the computing system may utilize a machine learning model to input the user activity data and determine one or more clusters from the user activity data. Some example machine learning models that may be used in example embodiments include connectivity, centroid, graph-based models, such as hierarchical clustering, k-means algorithm, or high connected subgraphs respectively, to name a few.

In operation 404, the computing system determines whether user activity data associated with the random user comprises a consistent pattern. For example, for each of the plurality of time periods (e.g., N time periods) the computing device analyzes user activity data associated with the random user of the plurality of users to determine whether the user activity data associated with the random user of the plurality of users comprises a consistent pattern. In one example, the user activity data analyzed by the computing system may be the summarized user activity data described above.

In one example, the computing device determines whether the user activity associated with the random user comprises a consistent pattern by analyzing the user activity associated with the user to determine user activity for each of the time periods in the plurality of the time periods, incrementing a count for each time period of the plurality of time periods that comprises user activity, and determining whether the user activity meets a predetermined threshold of user activity by comparing the count for each time period to the predetermined threshold. As described above, the predetermined threshold may be that the user is active at least half of the time, at least two-thirds of the time, or the like.

If the computing system determines that the user activity data associated with the random user does not comprise a consistent pattern, then the user activity data for the random user is removed from the user activity data, in operation 406, and the computing system returns to operation 402 to extract another random user.

If the computing system determines that the user activity data associated with the random user does comprise a consistent pattern, then the computing system generates a cluster associated with the consistent pattern, in operation 408. For example, the computing system may generate a new cluster to comprise a plurality of users and associate the cluster with an identification number or name (e.g., cluster 1, persona 1, "Kim" persona, etc.). In operation 410, the computing system adds the random user to the cluster associated with the consistent pattern.

In operation 412, the computing system analyzes the user activity data for the other users in the plurality of users to determine whether user activity data for each of the other users in the plurality of users comprises a similar pattern as the generated cluster. For example, the computing system compares a pattern of user activity data for each of the other users against a pattern of user activity data of the generated cluster (e.g., the pattern of user activity data associated with the random user). For example, if the pattern of the generated cluster comprises user activity during late afternoon and a preference for weekends, the computing device would determine if the user activity for the other users also comprises user activity during late afternoon and a preference for weekends.

In one example, user activity data for each of the other users in the plurality of users comprises a similar pattern as the generated cluster if the user is consistently active a certain period of time in the predetermined time period. For example, the predetermined time period of user data analyzed may be nine weeks. User activity data may be considered similar if the user is consistently active at least seven out of the nine weeks during the time periods of the cluster. The following is an example of a cluster:

Jen: cluster/persona Number 1
persona (unique) strength=33.7 percent (absolute: 5736)
good=4869 bad=867 aver_age=20 f_to_m_ratio=179
Mon 0-6 1 freq 2 percent 7.4 (absolute: 5796)
Tue/Wed/Thu 0-68 freq 2 percent 10.4 (absolute: 8187)
Fri 0-6 15 freq 2 percent 9.1 (absolute: 7139)
Sat/Sun 0-6 22 freq 2 percent 9.9 (absolute: 7753)
Sat/Sun 18-21 27 freq 1 percent 6.6 (absolute: 5210)
Sat/Sun 21-24 28 freq 1 percent 7.2 (absolute: 5625)

In the above example, the computing system may determine that a user activity comprises a similar pattern as the generated cluster because six of the most consistent time periods match the cluster. This is just one example, the exact parameters may be tweaked depending on the desired clustering output.

The computing system adds, to the generated cluster, each user that it determines to be associated with user data comprising a similar pattern to the consistent pattern of the generated cluster. In operation 414, the computing system removes, from the user activity data, user activity data associated with each user that was added to the generated cluster. In another example, the computing system may not remove the user activity data associated with each user added to the generated cluster, from the user activity data, but instead allow for creating overlapping clusters where some clusters may comprise users from other clusters.

In one example, the computing system may determine whether a number of users added to the generated cluster meet a threshold of users for a cluster. For example, a cluster may not be useful if it only has a few users out of, for example, one hundred thousand users. Thus, a threshold for a minimum number of users for a cluster may be set, such as one to two percent of the total plurality of users (e.g., one thousand users in one hundred thousand total users), or other threshold percent or number. If the threshold is not met, then the computing device may remove the users within the cluster and move on to step 416 to determine whether to generate a next cluster. If the threshold is met, the computing device moves on to operation 416 to determine whether to generate a next cluster.

In operation 416, the computing system determines whether or not more clusters may be generated. For example, the process of generating clusters may continue (e.g. using a greedy algorithm) until the computing system can no longer detect any more significant patterns or for a maximum number of runs. If the computing system determines that no more clusters may be generated, the process ends at 418. If more clusters may be generated, the computing system returns to operation 402 to generate the next cluster. For example, the computing system may analyze the user activity data to extract a second random user from the plurality of users and go through the operations to generate the cluster for the second random user (that has user activity comprising a consistent pattern as described above).

Figure 5:
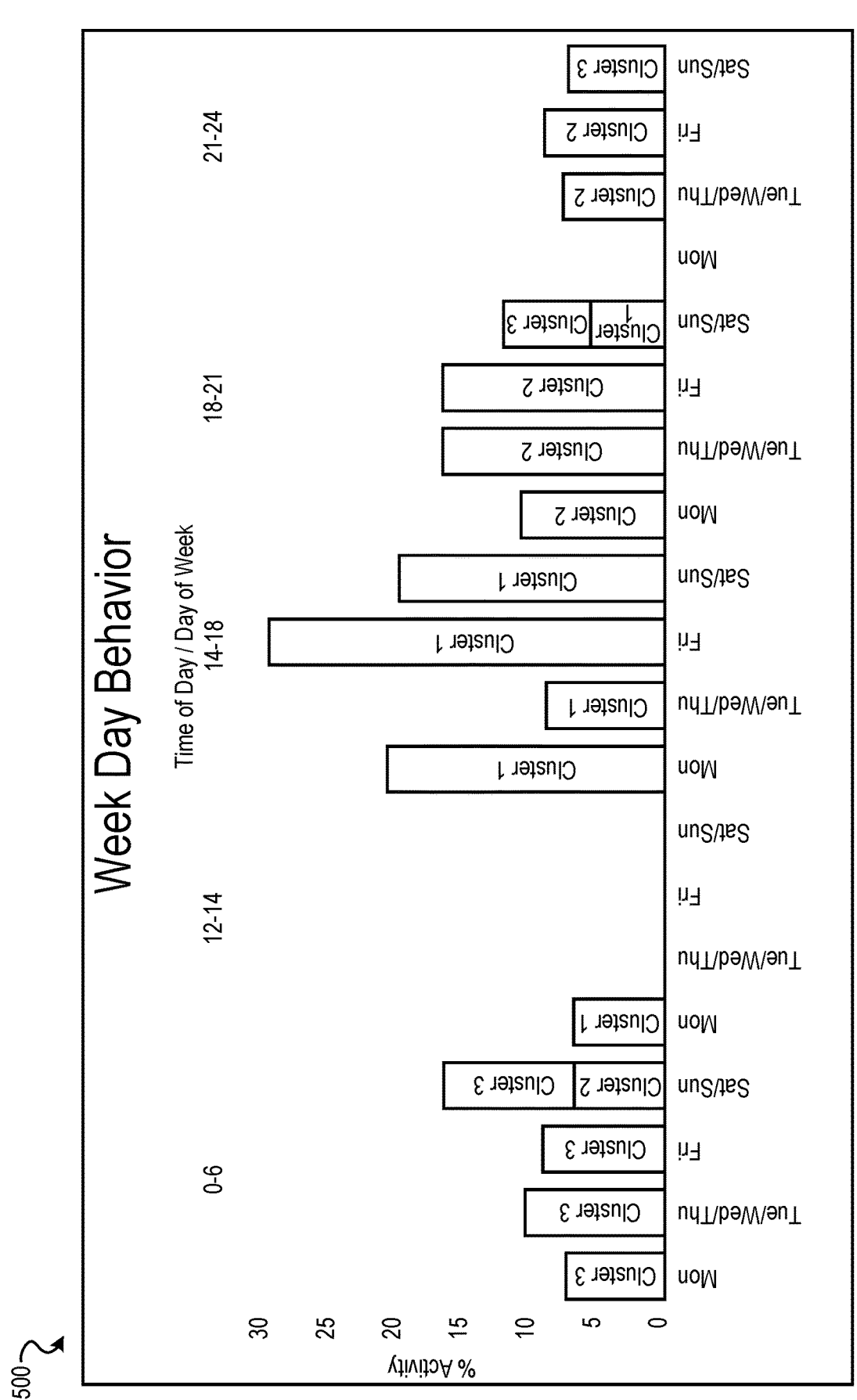
FIG. 5 is a diagram illustrating example clusters, according to some example embodiments.

Once the process ends at 418, the computing system may output a plurality of clusters that have been generated. The plurality of clusters may be stored in one or more databases 120 and/or provided to another system to use in content or functionality targeting. In one example, cluster 1 may comprise users active during the late afternoon with a preference for weekends, cluster 2 may comprise users active during mid evenings with a preference for weekdays, cluster 3 may comprise users active during late night and on both weekdays and weekends, and so forth. FIG. 5 illustrates an example graph 500 showing weekday behavior for the example clusters 1, 2, and 3. The hours from 6:00 am to noon are omitted from the graph since none of the users in the example clusters are active during these time periods. The example graph 500 shows which days and times (e.g., time periods) the users in each cluster are active. For example, cluster 3 is active in the time periods of Mon 0-6, Tue/Wed/Thu 0-6, Fri 0-6, Sat/Sun 0-6, Sat/Sun 18-21, and Sat/Sun 21-24.

Once the clusters are generated, they may be used as data for targeting content to users. For example, a third-party computing system may request clusters associated with user activity data (e.g., generate and send a request to the computing system). The third-party computing system may comprise an application used to create campaigns for content, analyze user data, and the like. The computing system may generate the clusters, as described above, or have already generated the clusters. The computing system may provide the generated clusters to the third-party computing system. In one example, the computing system may provide data associated with the clusters, based on user data for the users in the clusters and analysis of that data. Data associated with the clusters may include one or more primary time periods when a user in the cluster is active (e.g., late morning, mid evening, late night, etc.), one or more primary preferences for a day or days of the week (e.g., prefers weekends, prefers weekdays, active both weekends and weekdays, etc.), demographics (e.g., over age 25, between the ages of 18-24, between the ages 13-17, etc.), amount of time using the messaging system per day (e.g., half an hour per day, 45 minutes per day, 1.5 hours per day, etc.), and so forth. For example, the computing system may provide information about cluster 1 that includes that users in cluster 1 are active during late afternoon, have a preference for weekends, are older users with many over 25 years old, and use the messaging system a half hour per day.

The computing system may further analyze user data for users in each cluster to determine daily information about a number of media collections a user views daily, a number of media content items a user posts (adds) to one or more media collections, a number of media content items or messages a user sends to other users, a number of views of other content provided by the messaging system or content sharing platform, and so forth. For example, the computing system may provide information about cluster 1 that includes that users view about seventy-five media collections daily, posts about 2-3 media content items or messages to one or more media collections daily, sends 7-8 media content items or messages to other users daily, and views 2-3 other content provided by the messaging system or content sharing platform.

The computing system may further analyze user data for users in each cluster to determine content exposure (e.g., ad exposure, system functionality exposure, etc.). For example, the number of ads received per day, a percent of ad load, how long ads are viewed, how often a user interacts with an ad, how often a user installs an application represented by an ad, and so forth. For example, the computing system may provide information about cluster 1 that includes that users receive 4 ads per day, have a 3.3% ad load, view the best daily ad for 4 seconds, swipes on ads 0.9%, and installs app ads 0.02%.

The third-party computing system may then use the data to target content to users. The data may also be used to determine the best functionality or system functions to provide to users.

For example, a first cluster may be identified with "young night owls" and comprise users more responsive to direct response ads like mobile app install ads, whereas a second cluster may be identified with "older day-time person" and be more responsive to brand ads like video ads. The computing system may direct the relevant advertisers to target each of these clusters or personas directly, thereby making their ad spend more effective. Users also benefit by seeing ads which are more relevant to them.

Clusters or personas can also inform content ranking algorithms which sort user content to provide to a user based on their preferences and behavior. For example, certain clusters or personas may have common preferences and interests, allowing the computing system to infer a user's preferences and interests from their personas. In many cases the computing system may have partial or incomplete data on a user's preferences and interests, thus a more complete picture may be creating for a user by inferring from a user's persona. This added information can then be fed into content ranking algorithms which will better sort a user's content, creating a richer experience.

Some examples of how usage patterns may be stored as clusters comprise the following:
Jen: persona Number 1
persona (unique) strength=33.7 percent (absolute: 5736)
good=4869 bad=867 aver_age=20 f_to_m_ratio=179
Mon 0-6 1 freq 2 percent 7.4 (absolute: 5796)
Tue/Wed/Thu 0-68 freq 2 percent 10.4 (absolute: 8187)
Fri 0-6 15 freq 2 percent 9.1 (absolute: 7139)
Sat/Sun 0-6 22 freq 2 percent 9.9 (absolute: 7753)
Sat/Sun 18-21 27 freq 1 percent 6.6 (absolute: 5210)
Sat/Sun 21-24 28 freq 1 percent 7.2 (absolute: 5625)
Ryan: persona Number 7
persona (unique) strength=1.8 percent (absolute: 312)
good=262 bad=50 aver_age=22 f_to_m_ratio=144
Mon 18-21 6 freq 2 percent 11.0 (absolute: 113)
Tue/Wed/Thu 18-21 13 freq 2 percent 16.4 (absolute: 168)
Tue/Wed/Thu 21-24 14 freq 2 percent 7.6 (absolute: 78)
Fri 18-21 20 freq 1 percent 16.5 (absolute: 169)
Fri 21-24 21 freq 2
Sat/Sun 0-6 22 freq 2
percent 9.1 (absolute: 93)
percent 6.5 (absolute: 67)
Kim: persona Number 13
persona(unique)strength=1.8 percent (absolute: 314)
good=271 bad=43 aver_age=25 f_to_m_ratio=165
Mon 12-14 4 freq 1 percent 6.8 (absolute: 28)
Mon 14-18 5 freq 1 percent 20.5 (absolute: 84)
Tue/Wed/Thu 14-18 12 freq 1 percent 8.8 (absolute: 36)
Fri 14-18 19 freq 1 percent 29.6 (absolute: 121)
Sat/Sun 14-18 26 freq 2 percent 19.6 (absolute: 80)
Sat/Sun 18-21 27 freq 2 percent 4.4 (absolute: 18)
Example pseudocode for generating cluster may comprise the following:

```
read activity_data; //100K users×9 weeks×28 periods
run_number=1; //track number of failed attempts to create
    a persona
persona_map={ }; //stores persona numbers with list of
    relevant users
persona_number=1; //start with persona number 1
for random_user_activity in activity_data: //random user
    selection
    consistent_periods=find_consistent_periods(rando-
        m_user_activity);
    if consistent_periods !=[ ]: //user has a consistent
        pattern
        persona_map[persona_number]=[ ]; //initialize new
            persona in map
        persona_map[persona_number]·add
            (random_user_activity·user_id); //add user to per-
            sona
    for persona_candidate in activity_data: //find other
        users who also fit
        if consistent periods=find_consistent_periods(per-
            sona_candidate): //check if patterns are similar
            persona_map[persona_number]·add(persona_candi-
                date.user_id); //if so add this user
        if       len(persona_map[persona_number])>
            threshold: //threshold is 1-2% of the sample or 1K
            users
            persona_number+=1; //increment to next persona
                number
            activity_data·remove_users(persona_map[perso-
                na_number]); //remove users in persona from data
        else: //persona is below the threshold
            delete(persona_map[persona_number]);   //remove
                users within the persona run_number+=1; //incre-
                ment the run number counter
    If run_number>=max_runs:break; //terminate the loop if
        it exceeds the maximum runs
```

Example pseudocode for determining consistent periods for user activiy may comprise the following:

```
define function find_consistent_periods(user_activity):
    consistent_periods=[ ]; //keep track of user's consistent
        periods
    for weekly_periods in user_activity: //check each of the
        28 periods
        total_activity=0; //count number of active periods
        for weekly period in weekly periods: //loop through 9
            weeks of data
            total_activity+=1; //increment if user is active
```

```
if total_activity>=7: //check if user is active 7 out of
    9 weeks
        consistent_periods·add(weekly_period);    //add
            consistent period to list
        break; //step to weekly periods loop since we have
            a consistent period
    return consistent_periods;
```

Figure 6:
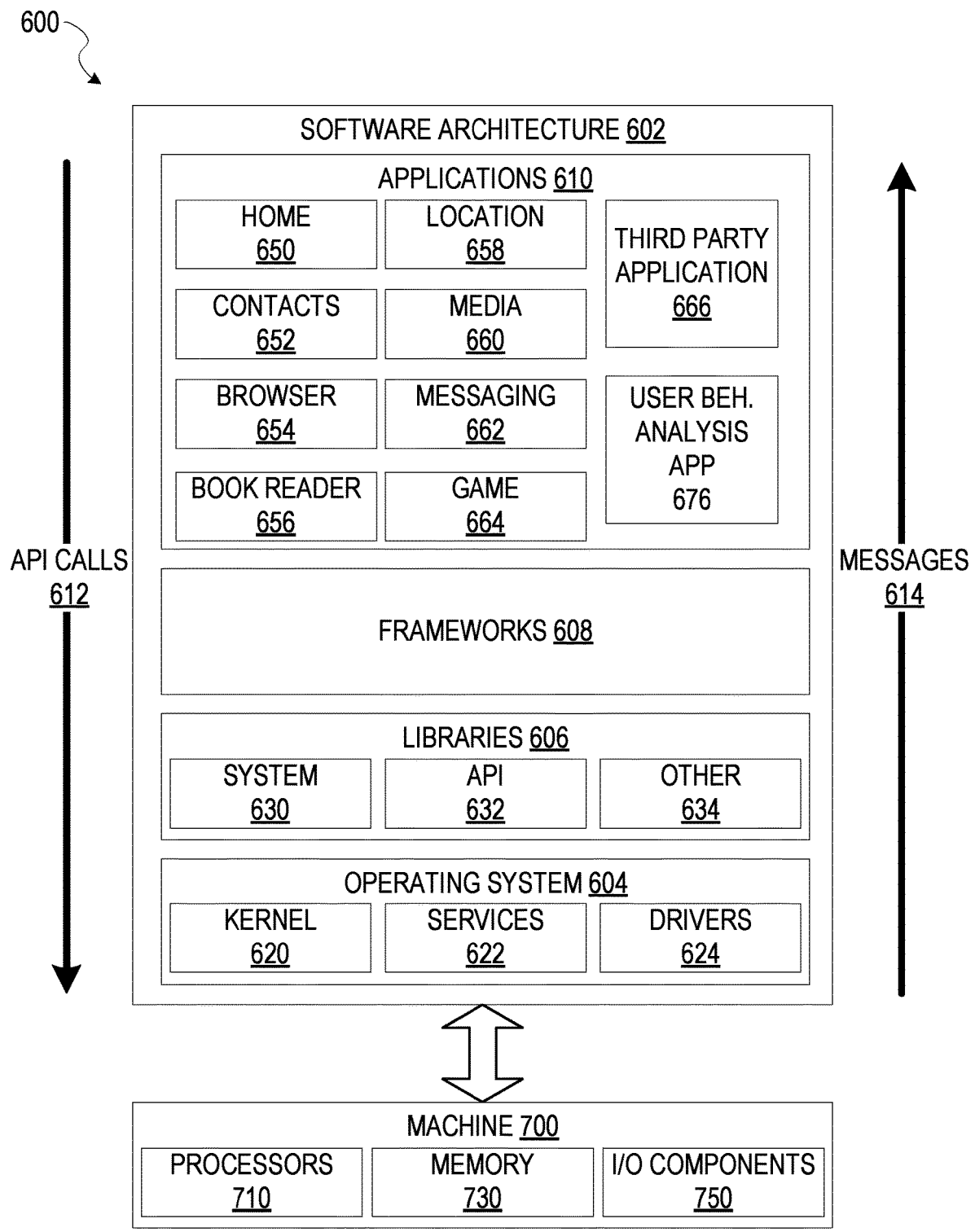
FIG. 6 is a block diagram illustrating an example of a software architecture that may be installed on a machine, according to some example embodiments.

FIG. 6 is a block diagram 600 illustrating a software architecture 602, which can be installed on any one or more of the devices described above. For example, in various embodiments, client devices 110, server systems 108, and servers 102, 112, 116, 118, 122, 124 and 128 may be implemented using some or all of the elements of the software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and input/output (I/O) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Some embodiments may particularly include a user behavior analysis application 667. In certain embodiments, this may be a standalone application that operates to manage communications with a server system such as third-party servers or the server system 108. In other embodiments, this functionality may be integrated with another application (e.g., messaging application 662). The user behavior analysis application 667 may request and display various data related to clusters and user data, messaging, media content, media collections, media overlays, and so forth, and may provide the capability for a user to input data related to the system via a touch interface, via a keyboard, or using a camera device of the machine 700, communication with a server system via I/O components 750, and receipt and storage of object data in memory 730. Presentation of information and user inputs associated with the information may be managed by the user behavior analysis application 667 using different frameworks 608, library 606 elements, or operating system 604 elements operating on the machine 700.

Figure 7:
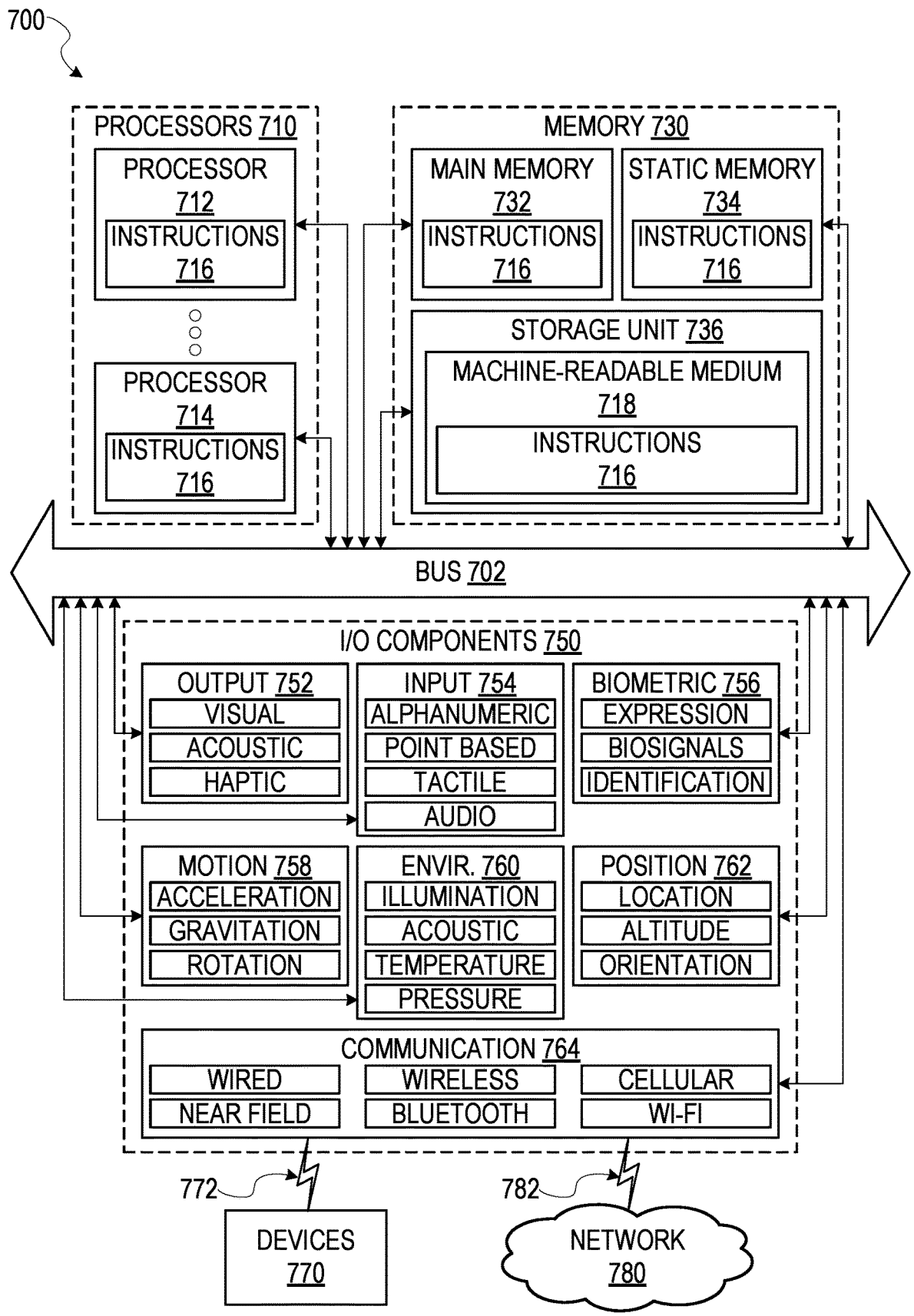
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine, 108, 112, 116, 118, 122, 124, 128 and the like, or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiple cores, or any combination thereof.

The memory 730 comprises a main memory 732, a static memory 734, and a storage unit 736 accessible to the processors 710 via the bus 702, according to some embodiments. The storage unit 736 can include a machine-readable medium 718 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 718.

As used herein, the term "memory" refers to a machine-readable medium 718 able to store data temporarily or permanently and may be taken to include, but not be limited to, random-access memory (RAM), read-only memory (ROM), buffer memory, flash memory, and cache memory. While the machine-readable medium 718 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 718 is non-transitory (in other words, not having any transitory signals) in that it does not embody a propagating signal. However, labeling the machine-readable medium 718 "non-transitory" should not be construed to mean that the medium is incapable of movement; the machine-readable medium 718 should be considered as being transportable from one physical location to another. Additionally, since the machine-readable medium 718 is tangible, the machine-readable medium 718 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    determining, based on user activity data generated by a plurality of computing devices associated with a plurality of users in a messaging computing system, when each user of the plurality of users meets a threshold time spent accessing a messaging application related to the messaging computing system during a subset of defined time periods;
    summarizing only user activity data for the subset of defined time periods when each user of the plurality of users meets the threshold time spent accessing the messaging application related to the messaging computing system;
    storing the summarized user activity data for each user for the subset of defined time periods during which each user meets the threshold time spent accessing the messaging application;
    extracting a random user from the plurality of users;
    determining the subset of defined time periods during which the random user meets the threshold time spent accessing the messaging application;
    generating a new cluster corresponding to a consistent pattern of activity comprising the subset of defined time periods during which the random user meets the threshold time spent accessing the messaging application and adding the random user to the new cluster;
    analyzing, for each user of the other users in the plurality of users, the stored summarized user activity data for the subset of defined time periods during which the user meets the threshold time spent accessing the messaging application to determine whether the stored summarized user activity data comprises a pattern of activity for accessing the messaging application that is similar to the consistent pattern of activity of the new cluster;
    adding, to the new cluster, each user with corresponding stored summarized user activity data comprising a similar pattern as the consistent pattern of activity of the new cluster and that was consistently active for at least a minimum number of weeks in a predetermined number of weeks covering the subset of defined time periods of the new cluster;
    continuing to generate and store new clusters until no more significant patterns are detected or a maximum number of runs has occurred;
    receiving a request for stored clusters from a third-party computing system that lacks data and/or processing capabilities to generate clusters based on the user activity data; and
    providing data associated with stored clusters to the requesting third-party computing system.

2. The computer-implemented method of claim 1, wherein determining when each user of the plurality of users meets a threshold time spent accessing the messaging application during a subset of defined time periods comprises:
    analyzing the user activity data associated with the user to determine user activity using the messaging computing system for each of the time periods in the plurality of time periods;
    incrementing a count for each of the defined time periods that comprises user activity; and
    determining when the user meets the threshold time spent accessing the messaging application by comparing the count for each time period to the threshold.

3. The computer-implemented method of claim 1, wherein the defined time periods are defined by grouping similar day of a week and time of the day together based on time periods that have similar user activity.

4. The computer-implemented method of claim 1, further comprising:
    determining whether a number of users added to the new cluster meet a threshold number of users for a cluster; and
    removing the users added to the new cluster from the new cluster based on determining that the number of users added to the new cluster does not meet the threshold number of users for a cluster.

5. The computer-implemented method of claim 1, further comprising:
    determining that a number of users added to the new cluster meets a threshold number of users for a cluster;
    extracting a second random user from the plurality of users;
    determining the second random user has a second consistent pattern; and
    generating a next new cluster associated with the second consistent pattern.

6. The computer-implemented method of claim 1, wherein the data associated with generated clusters comprises at least one of: a primary time period when a user in the cluster is active, a primary preference for a day or days of the week, demographics, or amount of time using the messaging computing system per day.

7. The computer-implemented method of claim 1, wherein the summarized user activity data comprises a list of defined time periods during which each user is consistently active.

8. The computer-implemented method of claim 1, wherein the defined time periods are based on generating a series of time correlation matrices to determine time intervals that can be grouped together into time periods.

9. The computer-implemented method of claim 8, further comprising:
    grouping together, into one time period, any two time intervals that are correlated significantly higher than an average correlation among all time intervals.

10. A computing system comprising:
    a memory that stores instructions; and
    one or more hardware processors configured by the instructions to perform operations comprising:
        determining, based on user activity data generated by a plurality of computing devices associated with a plurality of users in a messaging computing system, when each user of the plurality of users meets a threshold time spent accessing a messaging application related to the messaging computing system during a subset of defined time periods;

summarizing only user activity data for the subset of defined time periods when each user of the plurality of users meets the threshold time spent accessing the messaging application related to the messaging computing system;

storing the summarized user activity data for each user for the subset of defined time periods during which each user meets the threshold time spent accessing the messaging application;

extracting a random user from the plurality of users;

determining the subset of defined time periods during which the random user meets the threshold time spent accessing the messaging application;

generating a new cluster corresponding to a consistent pattern of activity comprising the subset of defined time periods during which the random user meets the threshold time spent accessing the messaging application and adding the random user to the new cluster;

analyzing, for each user of the other users in the plurality of users, the stored summarized user activity data for the subset of defined time periods during which the user meets the threshold time spent accessing the messaging application to determine whether the stored summarized user activity data comprises a pattern of activity for accessing the messaging application that is similar to the consistent pattern of activity of the new cluster;

adding, to the new cluster, each user with corresponding stored summarized user activity data comprising a similar pattern as the consistent pattern of activity of the new cluster and that was consistently active for at least a minimum number of weeks in a predetermined number of weeks covering the subset of defined time periods of the new cluster;

continuing to generate and store new clusters until no more significant patterns are detected or a maximum number of runs has occurred;

receiving a request for stored clusters from a third-party computing system that lacks data and/or processing capabilities to generate clusters based on the user activity data; and providing data associated with stored clusters to the requesting third-party computing system.

11. The computing system of claim 10, wherein determining when each user of the plurality of users meets a threshold time spent accessing the messaging application during a subset of defined time periods comprises:

analyzing the user activity data associated with the user to determine user activity using the messaging computing system for each of the time periods in the plurality of time periods;

incrementing a count for each of the defined time periods that comprises user activity; and determining when the user meets the threshold time spent accessing the messaging application by comparing the count for each time period to the threshold.

12. The computing system of claim 10, wherein the defined time periods are defined by grouping similar day of a week and time of the day together based on time periods that have similar user activity.

13. The computing system of claim 10, the operations further comprising:

determining whether a number of users added to the new cluster meet a threshold number of users for a cluster; and removing the users added to the new cluster from the new cluster based on determining that the number of users added to the new cluster does not meet the threshold number of users for a cluster.

14. The computing system of claim 10, the operations further comprising:

determining that a number of users added to the new cluster meets a threshold number of users for a cluster;

extracting a second random user from the plurality of users;

determining the second random user has a second consistent pattern; and generating a next new cluster associated with the second consistent pattern.

15. The computing system of claim 10, wherein the data associated with generated clusters comprises at least one of: a primary time period when a user in the cluster is active, a primary preference for a day or days of the week, demographics, or amount of time using the messaging computing system per day.

16. The computing system of claim 10, wherein the summarized user activity data comprises a list of defined time periods during which each user is consistently active.

17. A non-transitory computer-readable medium comprising instructions stored thereon that are executable by at least one processor to cause a computing device to perform operations comprising:

determining, based on user activity data generated by a plurality of computing devices associated with a plurality of users in a messaging computing system, when each user of the plurality of users meets a threshold time spent accessing a messaging application related to the messaging computing system during a subset of defined time periods;

summarizing only user activity data for the subset of defined time periods when each user of the plurality of users meets the threshold time spent accessing the messaging application related to the messaging computing system;

storing the summarized user activity data for each user for the subset of defined time periods during which each user meets the threshold time spent accessing the messaging application;

extracting a random user from the plurality of users;

determining the subset of defined time periods during which the random user meets the threshold time spent accessing the messaging application;

generating a new cluster corresponding to a consistent pattern of activity comprising the subset of defined time periods during which the random user meets the threshold time spent accessing the messaging application and adding the random user to the new cluster;

analyzing, for each user of the other users in the plurality of users, the stored summarized user activity data for the subset of defined time periods during which the user meets the threshold time spent accessing the messaging application to determine whether the stored summarized user activity data comprises a pattern of activity for accessing the messaging application that is similar to the consistent pattern of activity of the new cluster;

adding, to the new cluster, each user with corresponding stored summarized user activity data comprising a similar pattern as the consistent pattern of activity of the new cluster and that was consistently active for at least a minimum number of weeks in a predetermined number of weeks covering the subset of defined time periods of the new cluster;

continuing to generate and store new clusters until no more significant patterns are detected or a maximum number of runs has occurred;

receiving a request for stored clusters from a third-party computing system that lacks data and/or processing capabilities to generate clusters based on the user activity data; and providing data associated with stored clusters to the requesting third-party computing system.

18. The computer-implemented method of claim 1, wherein before extracting the random user from the plurality of users, the method comprises:

extracting a second random user from the plurality of users; and based on determining that user activity data associated with the second random user does not meet a threshold time spent accessing the messaging application, removing activity data associated with the second random user from the user activity data.

* * * * *